United States Patent
Zhang

(10) Patent No.: US 8,105,965 B2
(45) Date of Patent: Jan. 31, 2012

(54) ROOFING UNDERLAYMENT MATERIAL AND PROCESS FOR MAKING THE SAME

(76) Inventor: Guorong Zhang, Hangzhou (CN)

( * ) Notice: Subject to any disclaimer, the term of this patent is extended or adjusted under 35 U.S.C. 154(b) by 301 days.

(21) Appl. No.: 11/779,953

(22) Filed: Jul. 19, 2007

(65) Prior Publication Data

US 2008/0026663 A1    Jan. 31, 2008

(30) Foreign Application Priority Data

Jul. 19, 2006 (CN) .......................... 2006 1 0052564
May 21, 2007 (CN) .......................... 2007 1 0107857

(51) Int. Cl.
*B32B 11/10* (2006.01)

(52) U.S. Cl. .......... 442/398; 442/59; 442/327; 442/381; 442/394

(58) Field of Classification Search .................. 442/398, 442/59, 258, 327, 381, 394
See application file for complete search history.

(56) References Cited

U.S. PATENT DOCUMENTS

2004/0214489 A1 * 10/2004 Porter .............................. 442/36
2007/0077838 A1 * 4/2007 Binkley et al. ................ 442/286

FOREIGN PATENT DOCUMENTS

| CA | 2 561 263 A1 | 3/2007 |
|---|---|---|
| CN | 2382550 Y | 6/2000 |
| CN | 2581555 Y | 10/2003 |
| CN | 1621450 A | 6/2005 |

* cited by examiner

*Primary Examiner* — Peter Y Choi
(74) *Attorney, Agent, or Firm* — Ladas & Parry LLP

(57) ABSTRACT

The present invention relates to a waterproof material, wherein film layers are set between non-woven fabric layers, an asphalt layer is set between the film layers, and a net reinforcement layer is set within the asphalt layer. The advantages of the present invention include: (1) film layers are formed by laminating it on the compositing surfaces of the upper and lower non-woven fabric layers, which overcomes the drawback of water leaking in the background art, prevents the leaking of asphalt into the non-woven fabric or out of the non-woven fabric during the compositing process, so that the environmental pollution during transportation and application is avoided; (2) a glass-fiber netlike reinforcement layer is set within the asphalt layer, so that not only the tensile strength and compressive strength of the asphalt layer, but also the tensile strength and tear strength of the roofing underlayment material are improved; (3) the thickness and number of film layers are set to ensure the temperature-resistance and puncturing-resistance of film layers.

4 Claims, 1 Drawing Sheet

ROOFING UNDERLAYMENT MATERIAL AND PROCESS FOR MAKING THE SAME

FIELD OF THE INVENTION

The present invention relates to a water-proof material, in particular to a roofing underlayment material, and to a process for making the same.

BACKGROUND OF THE INVENTION

CA2561263 entitled "Multiple layer roofing underlayment material" discloses a multiple-layered roofing underlayment material comprising an inner core providing a continuous film water barrier, a first outer layer comprising a woven or spun bond fabric and a second outer layer comprising a woven or spun bond fabric, wherein the inner core binds the first outer layer to the second outer layer.

The inner core of the underlayment acts as a binder for the outer layers and provides water resistance through the use of a thermoplastic, resinous, wax, or polymeric material. Numerous material can be used to provide a continuous film water barrier inner core, such as asphalt, polyethylene terephthalate (PET), polyvinyl chloride (PVC), pine pitch, polypropylene, polyethylene, polyamides, polyester, and nylon. In the preferred embodiment, the inner core is a thermoplastic comprising asphalt because of the advantageous features associated with its physical properties, processability, and inexpensive cost. Asphalt's low cost allows for the efficient application of a sufficient film thickness in order to provide for good quality body, or a product that has a heavy canvas feel and adequate stiffness.

An outer layer 120 of the underlayment consists of a spun bond fabric layer. The spun bond fabric layer, when combined with an inner core 110 and a woven fabric outer layer 130, forms a three-layer underlayment material 100. A plurality of outer layers of either non-woven, e.g., spun bond, fabric or woven fabric can be used to produce a multi-layered underlayment material. Because the spun bond layer is not needed to provide strength to the product, it can be very light-weight material, such as 43 grams/m$^2$ or less.

Either a woven fabric or spun bond fabric can be used for the upper and/or the lower layer. One of the layers is preferably woven to ensure that the underlayment has good strength characteristics, and one of the layer is preferably a spun bond or other type of non-woven fabric. When used as a lower layer, the spun bond fabric layer provides good grip to the roof deck. The thermoplastic inner core can be positioned between two or more layers of either woven fabric or spun bond fabric, or any combination thereof.

However, the above multiple-layered roofing underlayment material still has the following drawbacks during practical application.

1. Poor waterproof and leak-resistant properties: Since the multiple-layered underlayment material has a relatively higher thermal shrinkage, when the multiple-layered underlayment material is fixed with nails, the parts of multiple-layered underlayment material around nails intensively shrink after being heated by sunshine, and as a result nails are separated from the multiple-layered underlayment material and circular orifices form around nails and cannot disappear under cooling. Thus water leaking or seepage will consequently occur.
2. Poor environmental protection properties: Since the inner core as mentioned in the background art is preferably asphalt for water-proof and binding, the upper and lower woven or spun bond fabric are bonded by the asphalt to form the roofing underlayment material. However, since the fluidity of asphalt in the multiple-layered roofing underlayment material under heating is not effectively controlled, the asphalt core between the upper and lower woven or spun bond fabric layers will inevitably flow or leak out of the upper and lower woven or spun bond fabric and cause environmental pollution.
3. Poor weathering resistance and peeling strength: the inherit properties of woven fabric lead to a non-affinity binding between the woven fabric and asphalt, such that the core of the multiple-layered roofing underlayment material formed by composite molding is prone to be peeled and separated, and will embrittle and age after being exposed to atmosphere for about 15 days and finally decomposes into powder. Thus, its weathering-resistant property and peeling strength may be poor.
4. Poor stiffness: Since the multiple-layered underlayment material does not contain a net-like reinforcement layer, when a roll of the multiple-layered underlayment material is open under hot weather, the material cannot automatically stretch so that construction efficiency and effect will be affected, and conglutination will inevitably occurs.
5. Light pollution: Since the outer layer of the multiple-layered underlayment material is white polypropylene that reflects sunshine intensively, the light pollution generated thereby is harmful to constructors. In addition, the poor anti-slip property will make the construction unsafe.
6. Poor practical applicability: Since the core of the multiple-layered underlayment material is preferably asphalt, due to the limitation of physical and chemical properties of asphalt, the asphalt layer has lower strength under cold weather and is prone to generate cracks and lose water-proof property; while the asphalt layer between the upper and lower woven or spun bond fabric layers flows out under hot weather because the fluidity of asphalt is not effectively controlled, such that water-proof and leak-resistant function cannot be implemented, at the meantime environment will be polluted.

SUMMARY OF INVENTION

The first objective of the present invention is to improve the water-proof and leak-resistant properties of a multiple-layered roofing underlayment material; the second objective is to avoid the environmental pollution caused by such a multiple-layered roofing underlayment material; the third objective is to enhance the weathering resistance and peeling strength of a multiple-layered roofing underlayment material; the fourth objective is to improve stiffness of a multiple-layered roofing underlayment material, to avoid conglutination and to increase construction efficiency; the fifth objective is to avoid light pollution and to improve the anti-slip property of a multiple-layered roofing underlayment material; and the sixth objective is to improve the practical applicability of a multiple-layered roofing underlayment material in order to achieve the purposes of water-proof, leak-resistance, anti-slip and non-pollution.

In order to fulfill the above objectives, the present invention employs the following structure design:
1. According to a characteristic of the present invention, film layers are set on the compositing surfaces between the non-woven fabric layers, which is to achieve the following purposes:
    (1) The films (plastic film layers) on the compositing surfaces between two non-woven fabric layers are useful to improve the water-proof and leak-resistance of the roofing underlayment material, so that the drawbacks in the background art are overcome.
    (2) Since the films (plastic film layers) on the compositing surfaces between two non-woven fabric layers can effectively bar asphalt material, the desired color of a non-woven fabric outer layer of the multiple-layered roofing underlayment material can be designed according to customer's requirements, so that the obtained product can meet different requirements of customers and can be used in extended fields.

2. According to another characteristic of the present invention, an asphalt layer is set between (upper and lower) film layers and a glass-fiber netlike reinforcement layer is set within the asphalt layer. This characteristic substantively overcomes drawbacks in the background art.

(1) Since upper and lower film layers are plastic film layers with good water-proof and an asphalt is set between the upper and lower film layers, the asphalt cannot leak into non-woven fabric layers, the affinity and composite effects between films are improved, the water-proof and leak-resistant properties of the multiple roofing underlayment material are enhanced, the reliability of product are increased greatly, and the environmental pollution of asphalt is avoid.

(2) When an asphalt layer is set between (upper and lower) film layers and a glass-fiber netlike reinforcement layer is set within the asphalt layer, the drawback of thermal shrinkage of the multiple-layered roofing underlayment material is substantively overcome. In particular, when the multiple-layered roofing underlayment material is fixed with nails, the multiple-layered roofing underlayment material is separated by the glass-fiber netlike reinforcement layer into grids that are not shrinkable due to the properties of glass-fiber netlike reinforcement layer, and thus the asphalt in the grids cannot flows away but still seals the nails even under directly exposure to sunshine, so that the drawback of separation between the multiple-layered roofing underlayment material and the nails in the background art is overcome, and the leaking of rain water is avoided as well.

(3) Since a glass-fiber netlike reinforcement layer is set within asphalt layer of the multiple-layered roofing underlayment material, the fluidity of asphalt under heating is effectively controlled. Thus, even under hot weather, asphalt is fixed by the glass-fiber netlike reinforcement layer, such that the strength of the asphalt layer is enhanced, the leaking of asphalt is avoided, and the application and environmental protection of product are ensured.

(4) Since a glass-fiber netlike reinforcement layer is set within the asphalt layer of the multiple-layered roofing underlayment material, which acts like steel bars in a concrete bridge floor, the tensile strength, compressive strength and tear strength of the asphalt layer are effectively improved, such that the drawback that asphalt flows under heating and embrittles under cooling is overcome, and the strength and compressive properties of the multiple-layered roofing underlayment material as a whole are improved effectively as well.

(5) Since a glass-fiber netlike reinforcement layer is set within the core of the multiple-layered roofing underlayment material, when a roll of a stiff multiple-layered roofing underlayment material, formed with the glass-fiber netlike reinforcement layer, a plurality of non-woven fabric layers, films and asphalt layer, is opened, the roll automatically stretches under the action of glass-fiber netlike reinforcement layer, so that the construction efficiency and effect are improved, and the drawback of conglutination in the roll of the multiple-layered roofing underlayment material is avoided.

(6) Since the outer layers of the multiple-layered roofing underlay-ment material have a dark color and do not reflect light under sunshine, light pollution does not occur and thus does not harm human eyes. In addition, the outer layers have a higher frictional coefficient and good anti-slip property, which facilitate safe construction.

3. According to another characteristic of the present invention, each film layer is one layer or two layers or multi-layers. The purposes of the design are as follows:

(1) When each film is of one layer, the film has a thickness with temperature-resistance and puncturing-resistance. The term "temperature-resistance" used herein is meant that the film thickness is enough to resist the temperature of the molten asphalt. That is, the film does not melt at the moment when contacting with molten asphalt. The term "puncturing-resistance" used herein is meant that the minor impurities in the molten asphalt cannot puncture through the film. Thus, the water-proof of the film layer will not be affected by temperature and impurities during the compositing process.

(2) When the film is of two or multiple layers, the purpose is still to ensure that the film layer with temperature-resistance and puncturing-resistance, i.e., the film does not melt at the moment when contacting with the molten asphalt, and is not punctured during the compositing process, in order to ensure the water-proof of the roofing underlayment material.

4. According to still another characteristic of the present invention, a glass-fiber netlike reinforcement layer is set within the non-woven fabric layers. The glass-fiber netlike reinforcement layer in the non-woven fabric layers not only can improve the tensile strength and compressive strength of the non-woven fabric layers per se, but also can improve the tensile strength, compressive strength and stability of the roofing underlayment material product comprising the non-woven fabric with the inner glass-fiber netlike reinforcement layer.

5. According to still another characteristic of the present invention, film layers are set between two layers or more layers. The film layers between the two non-woven fabric layers can prevent film layers from directly contacting with molten asphalt. Namely, the molten asphalt directly contacts with the surface of the non-woven layers instead of the film layers, so that the molten asphalt cannot melt film layers, and thus the integrality and water-proof of the film layers are maintained. Moreover, the minor impurities in the molten asphalt are absorbed by the non-woven fabric layers and thus cannot puncture film layers. As a result, the water-proof of the film layers will not be affected by temperature and impurities during the compositing process.

6. According to yet another characteristic of the present invention, modified asphalt is used in the roofing underlayment material. Since the modified asphalt has swelling—self sealing properties, when the modified asphalt is used as a component of the roofing underlayment material, it can self sealing the gap between nail and nail hole because the modified asphalt around nails swells instantly after the roofing underlayment material is fixed with nails. Thus, the purposes of self sealing and leaking-proof are achieved.

Technical Solution 1: A roofing underlayment material, comprising non-woven fabric layers, wherein film layers are set between the non-woven fabric layers, an asphalt layer is set between the film layers, and a glass-fiber netlike reinforcement layer is set within the asphalt layer.

Technical Solution 2: A roofing underlayment material comprising non-woven fabric outer layers, wherein a film layer is set between one of the non-woven fabric out layers and a non-woven fabric inner layer, a film layer and an asphalt layer are set in order between the non-woven fabric inner layer and another non-woven fabric outer layer, and a glass-fiber netlike reinforcement layer is set within the asphalt layer.

Technical Solution 3: A roofing underlayment material comprising non-woven fabric out layers, wherein a film layer is set between the compositing surfaces of the non-woven fabric layers to form a non-woven fabric/film composite layer, a film layer is set on the compositing surfaces of the non-woven fabric layer, a glass-fiber netlike reinforcement layer is set between the non-woven fabric layer (with film layer) and a non-woven fabric layer to form a non-woven fabric/film/net composite layer, and an asphalt layer is set between the non-woven fabric/film composite layer and the non-woven fabric/film/net composite layer.

Technical Solution 4: A modified asphalt useful in roofing underlayment material, wherein its raw materials have weight proportions as follows: 10-100# asphalt 39-60%, thermoplastic rubber 1-20%, fillers 30-60%.

Technical Solution 5: A process for making roofing underlayment material, comprising: (1) placing and mixing 39-60% of 10-100# asphalt, 1-20% of thermoplastic rubber and 30-60% of fillers in a reactor, heating and keeping asphalt at a temperature between 180° C. and 240° C., transferring asphalt into an asphalt extruding mold; (2) laminating the compositing surface of a non-woven fabric with a film layer to form a non-woven fabric/film composite layer; and (3) transferring upper and lower composite layers below the asphalt extruding mold, coating asphalt between the surfaces of the upper and lower composite layers, compositing and molding.

As compared with the background art, the advantages of the present invention includes: (1) film layers are formed by laminating it on the compositing surfaces of two non-woven fabric layers, which not only overcomes the drawback of water leaking in the background art, but also prevents the leaking of asphalt into the non-woven fabric or out of the non-woven fabric during the compositing process, so that the environmental pollution during transportation and application is avoided, in the meantime, the difficult problems of environmental pollution and conglutination to rollers caused by leaked asphalt are solved and thus ensures normal operation of production apparatus; (2) a glass-fiber netlike reinforcement layer is set within asphalt layer, so that the tensile strength and tear strength of both the asphalt layer and the roofing underlayment material as a whole are improved, and the tests indicate that the tensile strength is up to 100-1000N, and the tear strength is up to 500-4000 gf; (3) the thickness and number of film layers are set to ensure the temperature-resistance and puncturing-resistance of film layers, so that the water-proof of the film layers will not be affected by temperature and impurities during the compositing process; (4) a net reinforcement layer is set within the non-woven fabric layer, which improves not only the tensile strength and compressive strength of the non-woven fabric layer per se, but also those of the roofing underlayment material, and thus ensures the stability and reliability of product; (5) two or more film layers are set between layers, which prevent the film layers from being molten by directly contacting molten asphalt, to ensure the integrality and water-proof of the film layers, in the meantime, the non-woven fabric layers absorb the minor impurities in the molten asphalt to prevent the film layers from being punctured, such that the water-proof of the film layers will not be affected by temperature and impurities during the compositing process; (6) films (plastic film layers) are set between two non-woven fabric layers, which can effectively prevent the leaking of asphalt, so that the color of the non-woven fabric outer layer of the multiple-layered roofing underlayment can be designed according to customers' requirements, which not only meets the customer's requirements but also extends the application fields of the multiple-layered roofing underlayment material.

DETAILED DESCRIPTION

Example 1

Figure 1:
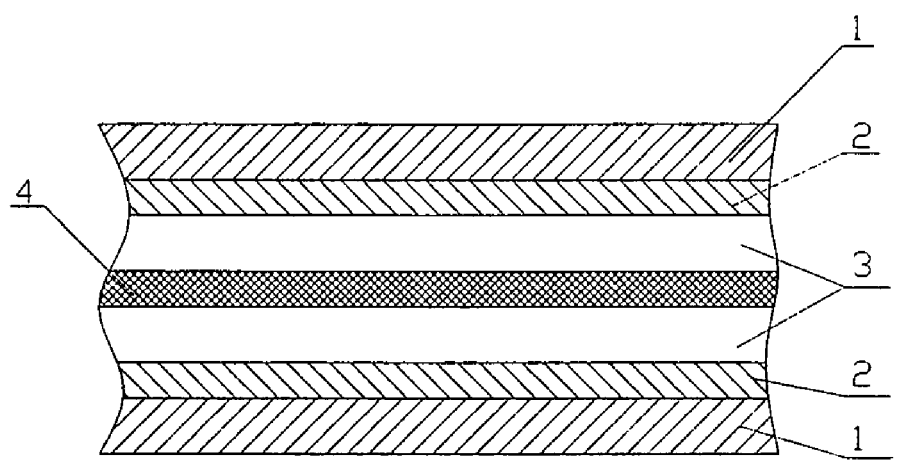
FIG. 1 is a schematic diagram of a roofing underlayment material profile structure according to the first embodiment of the present invention.

Referring to FIG. 1, a roofing underlayment material comprises non-woven fabric layers 1, in which the non-woven fabric can be classified into polypropylene fiber non-woven fabric, polyester fiber non-woven fabric and viscose fiber non-woven fabric based on material thereof, or into spunlaced non-woven fabric, calender-bonded non-woven fabric, air laid pulp non-woven fabric, wet laid non-woven fabric, spun-bond non-woven, needle-punched non-woven fabric, stitch-bonded non-woven fabric, etc. based on the process thereof, and the non-woven fabric layers are of one layer or two layers or more layers. The non-woven fabric layers 1 belong to the prior art and thus will not be described in detail here. Film layers 2 are set between the compositing surfaces of the non-woven fabric layers 1. The film layers 2 are PE film or PP film, which are plastic layers with water-proof and temperature-resistance. The technique for making the film layers belongs to the prior art and thus will not be described in detail here. An asphalt layer 3 is set between film layers 2, and a glass-fiber netlike reinforcement layer 4 is set within the asphalt layer 3. The glass-fiber netlike reinforcement layer 4 is a glass-fiber reinforcing fabric or web.

Example 2

On the basis of Example 1, each film layer 2 is one layer or two layers or multiple layers.

Example 3

Figure 2:
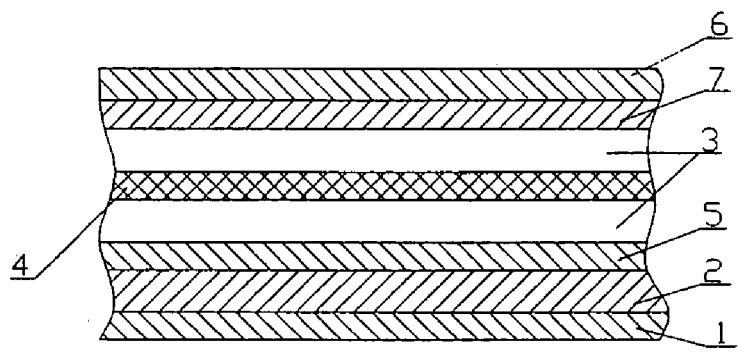
FIG. 2 is a schematic diagram of a roofing underlayment material profile structure according to the second embodiment of the present invention.

Referring to FIG. 2, a roofing underlayment material comprises non-woven fabric outer layers 1 and 6, wherein a film layer 2 is set between the non-woven fabric outer layers 1 and a non-woven fabric inner layer 5, a film layer 7 and an asphalt layer 3 are set in order between the non-woven fabric inner layer 5 and the non-woven fabric outer layer 6, and a glass-fiber netlike reinforcement layer 4 is set within the asphalt layer 3.

Example 4

On the basis of Example 1 or 3, a glass-fiber netlike reinforcement layer is set within the non-woven fabric inner layers, wherein the glass-fiber netlike reinforcement layer is a glass-fiber fabric or web, etc.

Example 5

On the basis of Example 1 or 3, a process for making the roofing underlayment material comprises: (1) placing and mixing 39-60% of 10-100# asphalt, 1-20% of thermoplastic rubber and 30-60% of fillers in a reactor, heating and keeping asphalt at a temperature between 180° C. and 240° C., transferring asphalt into an asphalt extruding mold; (2) laminating the compositing surface of non-woven fabric with a film layer to form a non-woven fabric/film composite layer; and (3) transferring the upper and lower composite layers below the asphalt extruding mold, coating asphalt between the surfaces of the upper and lower composite layers, compositing and molding, then edge-cutting, storing, measuring and winding to rolls.

Example 6

On the basis of Example 1 and 5, the upper and lower composite layers and the glass-fiber netlike reinforcement layer between the upper and lower composite layers are respectively transferred below the asphalt extruding mold, and asphalt is extruded and coated between the surfaces of the upper and lower composite layers and the surfaces of the glass-fiber netlike reinforcement layer, and then compositing and molding.

Example 7

On the basis of Example 1, a process for making roofing underlayment material comprises: (1) placing and stirring asphalt in a reactor, heating and keeping the asphalt at a temperature between 180° C. and 240° C., transferring asphalt into an asphalt extruding mold, wherein the weight proportions of raw materials are as follows: 10-100# asphalt: any value in the range of 39-60% (including end values); thermoplastic rubber: any value in the range of 1-20% (including end values); fillers: any value in the range of 30-60% (including end values); and the sum of the components of any combination is 100%; (2) preheating the compositing surface of non-woven fabric, placing a film layer between two non-woven fabric layers and heating and compositing to form a sandwich composite layer; (3) preheating the compositing surface of non-woven fabric, heating and compositing the film layer and the non-woven fabric layer to form a composite layer; (4) transferring the sandwich composite layer and the composite layer below the asphalt extruding mold, coating asphalt between the surfaces of the sandwich composite layer and the composite layer, compositing and molding, then edge-cutting, storing, measuring and winding to form rolls.

Example 8

On the basis of Example 1 and 7, the sandwich composite layer and the composite layer are transferred below the asphalt extruding mold, and the asphalt is coated on the surfaces of the sandwich composite layer and the composite layer and the glass-fiber netlike reinforcement layer, then are compounded and shaped.

Example 9

Figure 3:
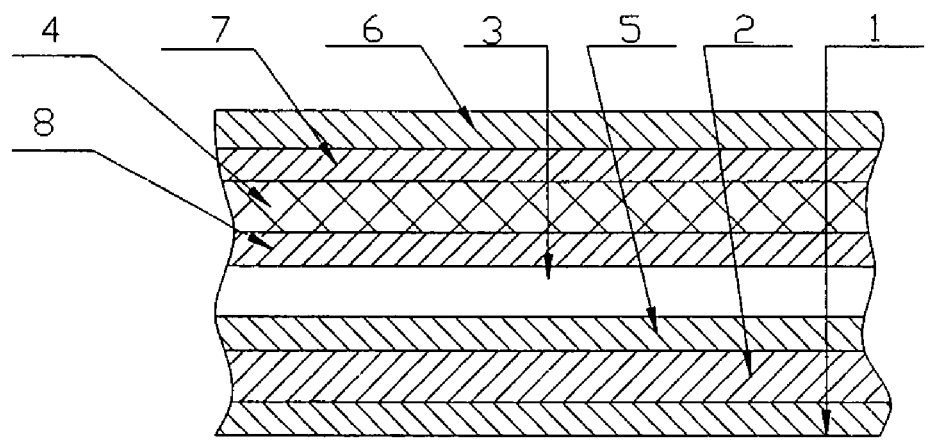
FIG. 3 is a schematic diagram of a roofing underlayment material profile structure according to the third embodiment of the present invention.

Referring to FIG. 3, a roofing underlayment material comprises non-woven fabric out layers, wherein a film layer 2 is set between the compositing surfaces of the non-woven fabric layer 1 and a non-woven fabric layer 5 to form a non-woven fabric/film composite layer, a film layer 7 is set on the compositing surfaces of the non-woven fabric layer 6, a glass-fiber netlike reinforcement layer 4 is set between the non-woven fabric layer 6 (with film layer 7) and a non-woven fabric layer 8 to form a non-woven fabric/film/net composite layer, and an asphalt layer 3 is set between the non-woven fabric/film composite layer and the non-woven fabric/film/net composite layer.

The present invention is further illustrated based on the above Examples.

An apparatus for production of the roofing underlayment material mainly comprises a molding device with opposite compression rollers, an expanding device at one side of the compression rollers for transferring non-woven fabric, an expanding device at another side for transferring non-woven fabric and glass-fiber net reinforcing fabric, a device above the compression rollers for transferring asphalt, wherein the device for transferring asphalt comprises a reaction pot for stirring asphalt, an asphalt gear pump and an extruding mold, wherein the extruding mold is positioned above the compression rollers and has an outlet opening exactly direct to the middle of the opposite compression rollers, the pot connects to the extruding mold via the asphalt gear pump, and an asphalt filter is set between the asphalt gear pump and the extruding mold. A heating device is set on the extruding mold to keep asphalt at a temperature between 180° C. and 240° C. so that asphalt has a homogeneous dispersion and temperature distribution. In this production line, an edge-cutting device, a storing device, a measuring device and a winding device are connected in order followed the molding device. An infrared device for adjusting bias is further set on the device for expanding fabric. The measuring device and the winding device are used to form rolls.

It should be noted that the above examples are used for illustrating the invention but not for restricting the invention, and any invention not going beyond the substantive inventive spirit of the present invention falls within the protection scope of the present invention.

What is claimed is:

1. A roll of roofing underlayment material comprising:
   a first composite layer consisting of:
      a first non-woven fabric layer;
      a second non-woven fabric layer; and
      a film layer between the first and second non-woven fabric layers;
   a second composite layer comprising:
      a third non-woven fabric layer;
      a glass-fiber net reinforcement layer forming a grid on the third non-woven fabric layer, wherein the glass-fiber net reinforcement layer is a glass-fiber fabric web;
      a second film layer on the glass-fiber net reinforcement layer; and
      a fourth non-woven fabric layer on the second film layer; and
   an asphalt layer between the first composite layer and the second composite layer.

2. A roofing underlayment material according to claim 1, wherein the asphalt layer is a modified asphalt comprising:
   39-60% by weight of 10-100# asphalt,
   1-20% by weight of thermoplastic rubber, and
   30-60% by weight fillers.

3. A roofing underlayment material according to claim 1, wherein at least one of the first or second film layers comprise a plurality of film sub-layers.

4. A roofing underlayment material according to claim 1, wherein at least one of the first or second film layers is at least one of a polyethylene (PE) film or a polypropylene (PP) film.

* * * * *